Patented Dec. 21, 1943

2,337,532

UNITED STATES PATENT OFFICE 2,337,532

ALKYL DERIVATIVES OF BENZENE-SULPHONYL FLUORIDE

Charles A. Thomas, Dayton, Ohio, assignor to Monsanto Chemical Company, a corporation of Delaware No Drawing. Application October 4, 1941,
Serial No. 413,691

6 Claims. (Cl. 260—543)

This invention relates to new derivatives of benzenesulphonyl fluoride, particularly to those carrying as nuclear substituents alkyl radicals having 8 to 18 carbon atoms and to a process for producing the same.

Davies and Dick (J. Chem. Soc. 1931, 2104 et seq.) have made benzenesulphonyl fluorides carrying methyl, chloro, or methoxy groups as nuclear substituents by boiling the corresponding sulphonyl chlorides with concentrated aqueous solutions of inorganic fluorides, but I have found that this method is not satisfactory for the preparation of higher alkyl benzenesulphonyl fluorides because under the conditions of the reaction the higher alkyl benzenesulphonyl chlorides are partially converted to the salts of the corresponding higher alkyl benzenesulphonic acids possessing pronounced forming and surface active tendencies. The presence of even minute amounts of said salts in the reaction mixture leads to such intense foaming and bumping that smooth conversion of the higher alkyl benzenesulphonyl chloride to the corresponding sulphonyl fluorides is prevented.

This invention has as an object the provision of new derivatives of benzenesulphonyl fluoride having the general formula:

$$RC_6H_4SO_2F$$

where R is an alkyl radical having 8 to 18 carbon atoms. A further object is the provision of a process for the preparation of such alkyl benzenesulphonyl fluoride derivatives. R may comprise octyl, decyl, dodecyl, tetradecyl, hexdecyl, octadecyl, or intermediate radicals.

These objects are accomplished by the following invention:

I have discovered that I can prepare the herein described new compounds by boiling higher alkyl benzenesulphonyl chlorides with concentrated aqueous solutions of inorganic fluorides in the presence of a material, e. g., xylene, which is a solvent for the alkyl benzenesulphonyl halides, but is substantially a non-solvent for the alkyl benzenesulphonic acids or their salts formed by hydrolysis of the sulphonyl chloride during the reaction. The presence of, e. g., xylene, in the reaction mixture minimizes frothing and bumping and facilitates ready conversion of the higher alkyl benzenesulphonyl chlorides into the higher alkyl benzenesulphonyl fluorides of this invention.

By the process of this invention it is possible to prepare acyl fluorides of those alkyl benzenesulphonic acids which have pronounced surface activity, whereas the prior art has been necessarily limited only to the preparation of acyl fluorides of those alkyl benzenesulphonic acids whose low surface activity in aqueous solution permitted smooth reaction during boiling of the sulphonyl chlorides with concentrated aqueous solutions of inorganic fluorides.

The following example illustrates but does not limit the manner in which this invention may be carried out:

EXAMPLE

A solution of approximately 334 g. (1.05 moles) of decyl benzenesulphonyl chloride, prepared in known manner by reaction of decyl benzene with chlorosulphonic acid, in approximately 261 g. of xylene was boiled for 2 hours with a solution comprising 200 g. of $KF.2H_2O$ in 200 cc. of water. The reaction mixture was cooled and diluted with water, shaken, and allowed to stand until complete separation of the organic layer had occurred. After removal of the organic layer, the water layer was re-extracted with xylene and the xylene extract combined with the original organic layer. The xylene was then removed from the product by distillation under vacuum, preferably at below 50° C. The product, comprising crude decylbenzenesulphonyl fluoride, was fractionally distilled at 1.5 mm. and the fraction boiling at 150-160° C. was collected. An approximately 95% of the theoretical yield of a fraction B. P. 150° C.–160° C./1.5 mm. was thus obtained. In order to purify the product further, it may be allowed to stand over anhydrous potassium carbonate and redistilled.

*Analysis of product*

I. 0.7052 g. sample.

Hydrolysis value: 8.99 cc. of 0.5221 N NaOH used; theoretical value for hydrolysis of decylbenzenesulphonyl fluoride is 9.00 cc. of 0.5221 N NaOH Florine content: 6.20% F found; theoretical F content of $C_{16}H_{25}SO_2F$ is 6.33%

II. 0.7652 g. sample.

Hydrolysis value: 9.71 cc. of 0.5221 N NaOH used; theoretical value for hydrolysis of 0.7652 g. of decylbenzenesulphonyl fluoride is 9.76 cc. of 0.5221 N NaOH Fluorine content: 6.21% F found; theoretical F content of $C_{16}H_{25}SO_2F$ is 6.33%

The decylbenzenesulphonyl fluoride obtained according to the herein described procedure is a slightly yellow liquid boiling at approximately 160° C. at 1.5 mm. It is insoluble in water and soluble in acetone, Stoddard solvent, hexane, lubricating oil, ethanol, trichlorobenzene, benzene, carbon tetrachloride, and dioxane. The decylbenesulphonyl fluoride is not hydrolyzed upon boiling with water and is completely stable upon boiling with .5 N sulphuric acid for 16 hours. It is not affected by heating to 250° C. on a copper bar.

Instead of the decylbenzensulphonyl chloride of the example, other alkylbenzenesulphonyl chlorides carrying an alkyl chain of 8 to 18 carbon atoms such as those mentioned above may be used for the purpose of this invention. In place of the xylene cited in the example as illustrative of a material which is a solvent for the higher alkylbenzenesulphonyl halides and substantially a non-solvent for the salts of higher alkylbenzenesulphonic acids other materials possessing these unique characteristics such as toluene, Stoddard solvent, or other relatively high boiling hydrocarbon solvent may be used.

The highly desirable properties of the new higher alkyl benzenesulphonyl fluorides of this invention, comprising solubility in a wide variety of solvents, high stability to hydrolysis and resistance to heat render them suitable for such applications as extreme pressure lubricants, additives to lubricants, oil-soluble surface active agents, plasticizers, etc.

As a plasticizer, or colloidizing agent, my new alkylbenzensulphonyl fluorides are of particular value in compounding stocks with rubber, either natural or artificial (butadiene copolymer rubbers) or in combination with halogenated, i. e. chlorinated rubber. Compounded with a synthetic rubber (Hycar OR) in the proportion of 100 parts of rubber to 20 parts of decylbenzenesulphonyl fluoride in which a milling time of 15 minutes was used, a plastometer (Firestone) reading (at 180° F. and 12 lbs. air pressure) of 14 and 16 seconds was obtained as compared with 90 to 93 seconds for unplasticized stock.

For various stocks the proportions of my new plasticizer may be varied as necessary for the development of various special properties.

It may also be compounded with synthetic rubbers of the Buna class, i. e. butadiene copolymerized with acrylonitrile and butadiene copolymerized with styrene and employed as a plasticizer or softening agent therein.

What I claim is:

1. A nuclear, mono-alkyl derivative of benzenesulphonyl fluoride in which the alkyl radical contains from 8 to 18 carbon atoms.
2. The sulphonyl fluoride of decylbenzene.
3. The sulphonyl fluoride of octylbenzene.
4. The sulphonyl fluoride of dodecylbenzene.
5. The process of producing a nuclear, monoalkyl derivative of benzenesulphonyl fluoride in which the alkyl radical contains from 8 to 18 carbon atoms, comprising heating the corresponding alkylbenzenesulphonyl chloride in the presence of a liquid hydrocarbon which is a solvent for said alkylbenze sulphonyl chloride and is a non-solvent for the corresponding sulphonic acid and salts thereof with a concentrated aqueous solution of an inorganic fluoride.
6. The process of producing a nuclear, monoalkyl derivative of benzensulphonyl fluoride in which the alkyl radical contains from 8 to 18 carbon atoms, comprising heating the corresponding alkylbenzenesulphonyl chloride in the presence of xylene with a concentrated aqueous solution of an inorganic fluoride.

CHARLES A. THOMAS.